United States Patent
Eftekhari et al.

(10) Patent No.: US 9,558,521 B1
(45) Date of Patent: Jan. 31, 2017

(54) SYSTEM AND METHOD FOR POPULATING A FIELD ON A FORM INCLUDING REMOTE FIELD LEVEL DATA CAPTURE

(75) Inventors: Amir R. Eftekhari, San Diego, CA (US); Alan Tifford, San Diego, CA (US)

(73) Assignee: Intuit Inc., Mountain View, CA (US)

(*) Notice: Subject to any disclaimer, the term of this patent is extended or adjusted under 35 U.S.C. 154(b) by 989 days.

(21) Appl. No.: 13/239,732

(22) Filed: Sep. 22, 2011

(51) Int. Cl.
 *G06Q 40/00* (2012.01)

(52) U.S. Cl.
 CPC .............. *G06Q 40/12* (2013.12); *G06Q 40/10* (2013.01); *G06Q 40/123* (2013.12)

(58) Field of Classification Search
 CPC .............................. G06Q 40/10; G06Q 40/123
 USPC .......................................................... 705/30
 See application file for complete search history.

(56) References Cited

U.S. PATENT DOCUMENTS

| | | |
|---|---|---|
| 4,553,261 A | 11/1985 | Froessl |
| 4,890,228 A | 12/1989 | Longfield |
| 5,138,549 A | 8/1992 | Bern |
| 5,193,057 A | 3/1993 | Longfield |
| 5,644,724 A | 7/1997 | Cretzler |
| 5,724,523 A | 3/1998 | Longfield |
| 5,774,872 A | 6/1998 | Golden et al. |
| 5,875,433 A | 2/1999 | Francisco et al. |
| 5,909,794 A | 6/1999 | Molbak et al. |
| 5,963,921 A | 10/1999 | Longfield |
| 6,032,137 A | 2/2000 | Ballard |
| 6,078,924 A | 6/2000 | Ainsbury et al. |
| 6,202,052 B1 | 3/2001 | Miller |
| 6,473,741 B1 | 10/2002 | Baker |
| 6,601,044 B1 | 7/2003 | Wallman |
| 6,651,217 B1 * | 11/2003 | Kennedy et al. .............. 715/224 |
| 6,697,787 B1 | 2/2004 | Miller |
| 6,823,478 B1 | 11/2004 | Prologo et al. |
| 6,850,950 B1 | 2/2005 | Clarke et al. |
| 6,996,546 B1 | 2/2006 | Giles et al. |

(Continued)

FOREIGN PATENT DOCUMENTS

| | | |
|---|---|---|
| JP | 2006260521 A | 9/2006 |
| JP | 2006268302 A | 10/2006 |

(Continued)

OTHER PUBLICATIONS

"Taxware (R) Enhances Functionality of Sales/Use Tax System with Interface to PaperVision (R) Enterprise Software for Document Management", PR Newswire Jun. 17, 2003, Business Dateline, 3 pages.

(Continued)

*Primary Examiner* — Ramsey Refai
(74) *Attorney, Agent, or Firm* — Osha Liang LLP

(57) ABSTRACT

In general, in one aspect, the invention relates to a method for populating a field on a form. The method includes: establishing a communication session between a first computing device and a second computing device; receiving, from a user of the first computing device, a selection of source data; transferring, over the secure communication session, the source data from the first computing device to the second computing device; matching, based on a matching criterion, the source data to the field in the second computing device; calculating, after matching the source data to the field, a value for the field based on the matching criterion and the source data; and populating the field with the value.

20 Claims, 7 Drawing Sheets

(56) References Cited

U.S. PATENT DOCUMENTS

| | | | |
|---|---|---|---|
| 7,069,240 B2 * | 6/2006 | Spero et al. .................... 705/30 |
| 7,117,374 B2 | 10/2006 | Hill et al. |
| 7,159,770 B2 * | 1/2007 | Onozu ......................... 235/383 |
| 7,200,806 B2 * | 4/2007 | Sahu ............................. 715/224 |
| 7,267,280 B2 * | 9/2007 | Lubow ..................... 235/462.01 |
| 7,379,921 B1 * | 5/2008 | Kiliccote ............ G06Q 20/401 |
| | | 705/75 |
| 7,533,039 B2 * | 5/2009 | Hoffman et al. .............. 705/15 |
| 7,548,885 B2 | 6/2009 | Dutta et al. |
| 7,610,227 B2 | 10/2009 | Wyle |
| 7,668,763 B1 | 2/2010 | Albrecht |
| 7,747,484 B2 | 6/2010 | Stanley et al. |
| 7,886,219 B2 * | 2/2011 | Lund ............................ 715/222 |
| 8,244,037 B2 * | 8/2012 | Huang .......................... 382/181 |
| 8,661,002 B2 * | 2/2014 | Smith et al. .................. 707/694 |
| 8,701,166 B2 * | 4/2014 | Courtney ............... G06F 21/31 |
| | | 726/5 |
| 2002/0111888 A1 | 8/2002 | Stanley et al. |
| 2004/0199905 A1 * | 10/2004 | Fagin et al. .................. 717/136 |
| 2005/0004885 A1 | 1/2005 | Pandian et al. |
| 2005/0165780 A1 | 7/2005 | Omega et al. |
| 2005/0203970 A1 | 9/2005 | McKeown et al. |
| 2006/0026083 A1 | 2/2006 | Wyle |
| 2006/0080305 A1 | 4/2006 | Dill et al. |
| 2007/0027894 A1 | 2/2007 | Bridges et al. |
| 2007/0198910 A1 * | 8/2007 | Jensen et al. ................. 715/505 |
| 2007/0260974 A1 | 11/2007 | Hauser |
| 2009/0132590 A1 * | 5/2009 | Huang ....................... 707/104.1 |
| 2009/0180136 A1 | 7/2009 | Teranishi |
| 2009/0228707 A1 * | 9/2009 | Linsky ................... G06F 21/31 |
| | | 713/171 |
| 2010/0306185 A1 * | 12/2010 | Smith et al. .................. 707/709 |
| 2011/0264703 A1 * | 10/2011 | Lydick et al. ............... 707/797 |

FOREIGN PATENT DOCUMENTS

| | | |
|---|---|---|
| JP | 2007011560 A | 1/2007 |
| JP | 2007034916 A | 2/2007 |
| JP | 2007328549 A | 12/2007 |
| JP | 2008077245 A | 4/2008 |
| JP | 2010009158 A | 1/2010 |
| JP | 2010128964 A | 6/2010 |
| KR | 20070005407 A | 1/2007 |

OTHER PUBLICATIONS

Office Action in Application No. 2,420,481, Canadian Intellectual Property Office, May 31, 2006, 6 pages.

"H&R Block and NetZero Offer Consumers Fast, Accurate Online Tax Preparation and Filing", United Online Press Release, Mar. 28, 2000 (http://irconnect.com/untd/pages/news_releases.html?d=16829), 2 pages.

"Microsoft and Block Financial Help Consumers Ease the Pain of Tax Season", Microsoft PressPass, Jan. 7, 1998, (http://www.microsoft.com/presspass/press/1998/jan98/kipingpr.mspx), 3 pages.

"Backup Powers Online Data Protection Service for Quicken TurboTax Users", Gale Group New Product Announcement, Jan. 17, 2000, 2 pages.

International Search Report from PCT/US01/26182, dated Aug. 21, 2001, 7 pages.

"Internet Access: Intuit to Provide Internet Access Directly from Quicken", Gale Group Newsletter, vol. 6, No. 283. Oct. 23, 1995, 6 pages.

Kelly, D., "MacinTax Final Version Releases Earlier than Ever", Business Dateline, Jan. 1, 1993, 3 pages.

"Open Financial Exchange", Specification 2.0, 2000 Intuit Inc., Microsoft Corporation, Apr. 1, 2000, 538 pages.

"Quicken Turbo Tax Deluxe: User's Guide TurboTax Deluxe—Tax Year 1999", Jan. 1999, 32 pages.

"TurboTax: The Easiest Way to Do Your Taxes User's Guide for Windows 95 and Windows 3.1", Tax Year 1995, Jan. 1995, 58 pages.

International Search Report and Written Opinion issued in PCT/US2011/026330 dated Feb. 25, 2011 (8 pages).

International Search Report and Written Opinion issued in PCT/US2011/026340 dated Feb. 28, 2012. (14 pages).

* cited by examiner

SYSTEM AND METHOD FOR POPULATING A FIELD ON A FORM INCLUDING REMOTE FIELD LEVEL DATA CAPTURE

CROSS REFERENCE TO RELATED APPLICATIONS

The present application may include subject matter related to the subject matter in U.S. patent application Ser. No. 13/030,983, filed on Feb. 18, 2011, and entitled "SYSTEMS METHODS AND COMPUTER PROGRAM PRODUCTS FOR ENCODING AND DECODING TAX RETURN DATA." application Ser. No. 13/030,983 has a common assignee with the present application and is incorporated by reference herein, in its entirety, for all purposes.

The present application may include subject matter related to the subject matter in U.S. patent application Ser. No. 12/914,902, filed on Oct. 28, 2010, and entitled "INSTANT TAX RETURN PREPARATION." application Ser. No. 12/914,902 has a common assignee with the present application and is incorporated by reference herein, in its entirety, for all purposes.

The present application may include subject matter related to the subject matter in U.S. patent application Ser. No. 12/845,947, filed on Jul. 29, 2010, and entitled "TECHNIQUE FOR COLLECTING INCOME-TAX INFORMATION." application Ser. No. 12/845,947 has a common assignee with the present application and is incorporated by reference herein, in its entirety, for all purposes.

BACKGROUND

As our dependence on consumer electronics and computing devices has increased, the amount of data stored on these devices has reached unprecedented levels. Each device is suited to a specific set of uses and, in some cases, is incompatible with other devices. For example, smartphones and tablet personal computers (PCs) may not be configured to share various types of data or to utilize shared data effectively. Thus, users are required to perform duplicate data entry and, as a result, many computing devices contain redundant data.

One common function of a PC is the population of forms. As traditional paper forms become increasingly rare, electronic forms are commonplace. Users may populate electronic forms by entering data into one or more fields and by navigating between fields on a page or in a dialog box. Forms may reside in a web application, a traditional client application, in a mobile application, and/or in any number of computing devices.

While populating a form may seem to be a trivial task, many forms are extremely complex and require hours of rigorous input and calculation. Tax forms, for example, can be long and immensely complicated. Various fields within the form may be dependent upon values entered in other fields or in other documents altogether. As a result, users may be required to enter the same inputs into multiple fields on multiple devices or to enter data into one device which already exists in another device.

SUMMARY

In general, in one aspect, the invention relates to a method for populating a field on a form. The method includes: establishing a communication session between a first computing device and a second computing device; receiving, from a user of the first computing device, a selection of source data; transferring, over the secure communication session, the source data from the first computing device to the second computing device; matching, based on a matching criterion, the source data to the field in the second computing device; calculating, after matching the source data to the field, a value for the field based on the matching criterion and the source data; and populating the field with the value.

In general, in one aspect, the invention relates to non-transitory computer-readable storage medium storing instructions for populating a field on a form. The instructions include functionality to: establish a communication session between a first computing device and a second computing device; receive, from a user of the first computing device, a selection of source data; transfer, over the secure communication session, the source data from the first computing device to the second computing device; match, based on a matching criterion, the source data to the field in the second computing device; calculate, after matching the source data to the field, a value for the field based on the matching criterion and the source data; and populate the field with the value.

In general, in one aspect, the invention relates to a system for populating a field on a form. The system includes: a first computing device configured to receive, from a user, a selection of source data; a second computing device including a client application configured to: display the form to the user and populate the field with a value; and a mediation service configured to: establish a communication session between the first computing device and the second computing device, transfer, over the secure communication session, the source data from the first computing device to the second computing device, match, based on a matching criterion, the source data to the field in the second computing device, calculate, after matching the source data to the field, the value for the field based on matching the criterion and the source data, and send the value to the second computing device.

Other aspects of the invention will be apparent from the following description and the appended claims.

DETAILED DESCRIPTION

Figure 1:
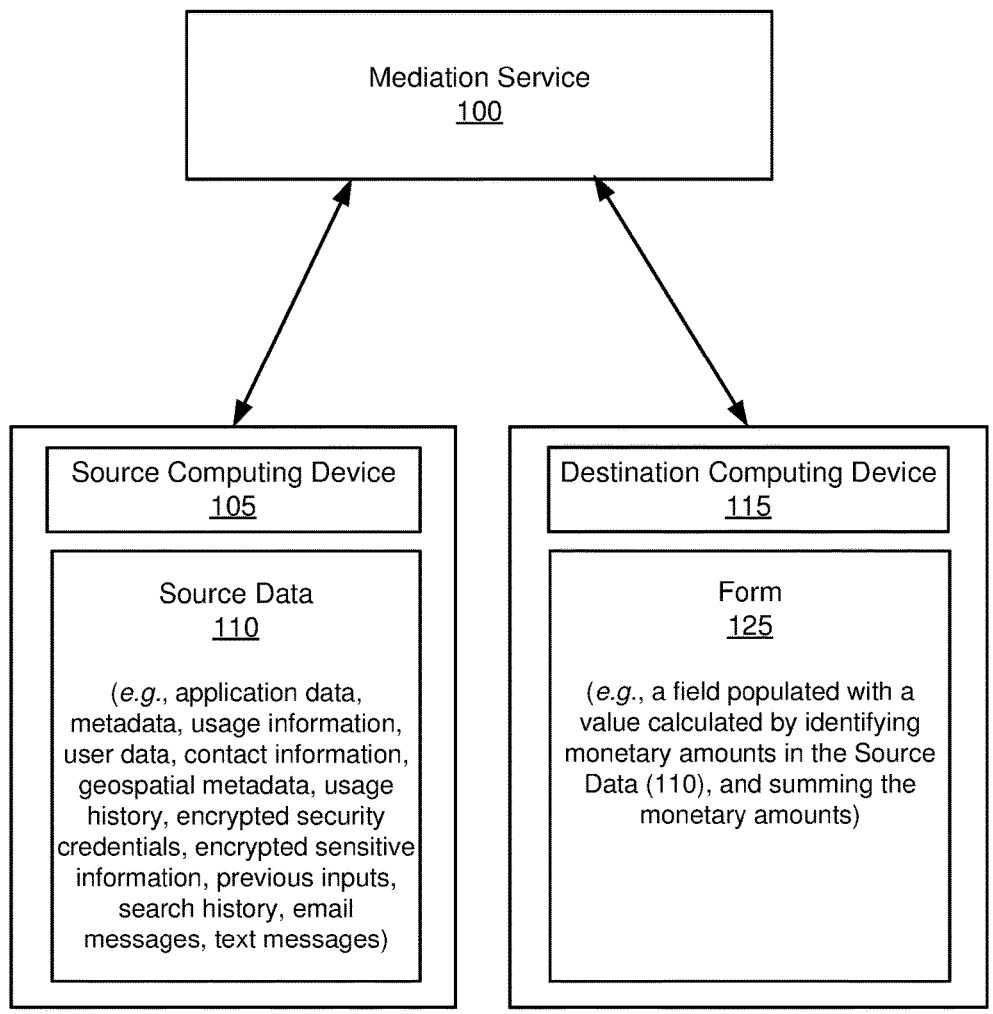
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for populating a field on a form based on source data obtained from a source computing device. In general, embodiments of the invention receive a selection of source data from a user of the source computing device. A communication session may then be established between the source computing device and a destination computing device having the form in order to transfer the source data to the destination computing device. A value for the field may be calculated based on the source data and the field may be populated with the value.

FIG. 1 shows a system (199) in accordance with one embodiment of the invention. As shown in FIG. 1, the system has multiple components including a mediation service (100), a source computing device (105), source data (110), a destination computing device (115), and a form (125). The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the source computing device (105) and the destination computing device (115) are hardware devices including at least one processor. Examples of a computing device may include, but is not limited to, a smartphone, a laptop computer, a PC, a server, a tablet PC, a personal digital assistant (PDA), and a netbook.

In one or more embodiments of the invention, source data (110) is data stored in a memory of the source computing device (105). The memory may be a hard disk, a memory card, a subscriber identity module (SIM) card, a random access memory (RAM), and/or any memory device within or connected to the source computing device (105). Source data (110) may include application data, metadata, usage information, and/or user data obtained from the source computing device (105). Examples of source data (110) may include, but is not limited to, contact information from a user's mobile telephone, geospatial metadata associated with one or more media files of a user, usage history of a user, encrypted security credentials of a user, encrypted sensitive information of a user (e.g., financial data, health data, credit information, etc.), previous inputs to one or more fields, search history of a user, an email message, and a text message.

In one or more embodiments of the invention, the mediation service (100) includes functionality to receive, from a user of the first computing device, a selection of source data (110). The selection of source data (110) may be received by a user interface of the source computing device (105). The user interface may be implemented within an operating system of the source computing device (105) and/or an application executing on the source computing device (105). For example, a contact may be selected from a contact list of a user's mobile device. In another example, a small business owner may utilize a mobile device to track inventory, purchasing, and/or business finances. In this example, the business owner may select one or more financial amounts from the mobile device as source data.

In one or more embodiments of the invention, a form (125) is any collection of associated fields. A form (125) may be an electronic representation of the collection of associated fields in a user interface or a series of user interfaces. Examples of a form (125) may include, but is not limited to, a tax form published by a government agency, a series of related questions in an interview-based application, a set of fields on a web page, a billing information page of an electronic commerce website, a health insurance subscription form, a medical claim form, a payroll tax form, a financial statement, and/or any other document or set of related fields.

In one or more embodiments of the invention, the form (125) is displayed in a client application (not shown). The client application is a software application or a set of software applications executing on one or more hardware processors of the destination computing device (115). The software application may be a web application hosted by an external server and/or a cloud computing application in a network distributed system. Alternatively, the client application may be a software application installed locally on the destination computing device (115). In one or more embodiments of the invention, the client application is integrated within or operatively connected to an email application, a personal information manager, a financial management application (FMA), or other type of application.

Figure 3:
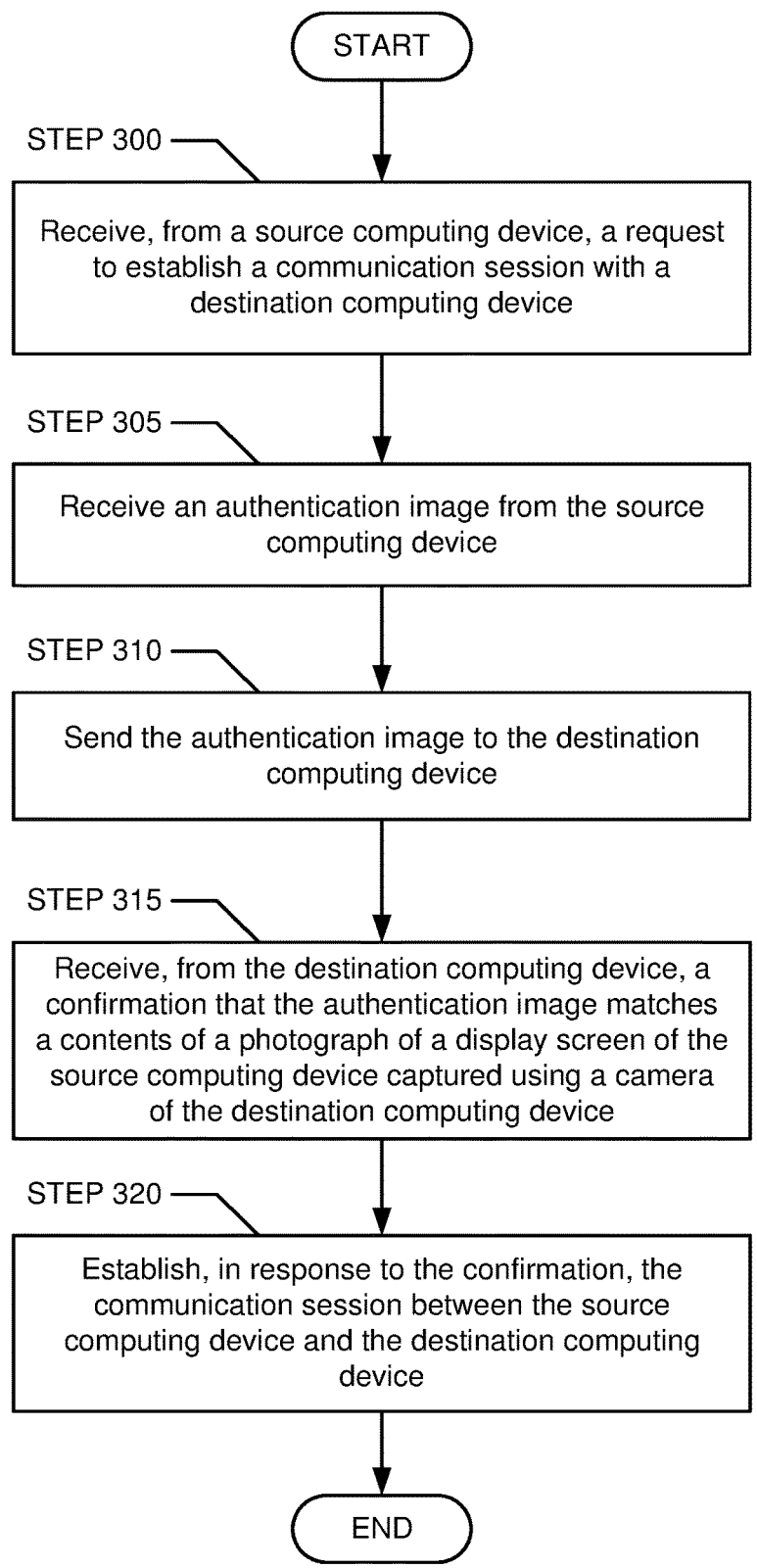

In one or more embodiments of the invention, the mediation service (100) includes functionality to establish a communication session between the source computing device (105) and the destination computing device (115). The mediation service (100) may establish the secure communication session over a wired or wireless connection (e.g., Bluetooth, local area network (LAN), the Internet, near field communication (NFC), etc.), or any combination thereof. The secure communication session may involve encryption and decryption of data using one or more encryption algorithms (e.g., Advanced Encryption Standard (AES) encryption). FIG. 3 describes a method of establishing a secure communication session, in accordance with various embodiments of the invention.

In one or more embodiments of the invention, the mediation service (100) includes functionality to transfer, over a secure communication session, the source data (110) from the source computing device to the destination computing device. The mediation service (100) may be configured to transfer the source data (110) in response to a selection from a user of the source computing device (105). The selection may be received by a user interface of the source computing device (105). In one or more embodiments of the invention, the source computing device (105) may be configured to receive a selection of a future time to transfer the source data (110). Thus, the source computing device (105) may receive one or more updates to the source data (110) or may receive the entirety of the source data (110) after receiving the selection of the future time.

In one or more embodiments of the invention, the mediation service (100) includes functionality to receive an authentication image from the source computing device (105). Examples of an authentication image may include, but are not limited to, an image of a barcode, a Quick Response code, an image uploaded to the source computing device (105) by a user, a photograph of a user, an image including a timestamp or other temporal element, and/or any other image in accordance with various embodiments of the invention.

In one or more embodiments of the invention, the mediation service (100) includes functionality to send the authentication image to the destination computing device (115). The mediation service (100) may send the authentication image (and any other communication) to the destination computing device (115) over the secure communication session. In one or more embodiments of the invention, the mediation service (100) includes functionality to receive, from the destination computing device (115) a confirmation of the authentication image.

In one or more embodiments of the invention, the mediation service (100) includes functionality to register a user of the source computing device (105) by receiving an initial selection of an authentication image. In this case, the mediation service (100) may send the authentication image to the source computing device (105) in order to authenticate itself to the user of the source computing device (105) prior to receiving one or more security credentials from the user.

In one or more embodiments of the invention, the mediation service (100) includes functionality to identify one or more matching criteria associated with a field on a form (125). The mediation service may receive the matching criteria from a user interface via a connected computing device (e.g., the source computing device (105), destination computing device (115)). A matching criterion may be any criterion for matching one or more source data (110) items to a field on a form (125). The matching criterion may include one or more conditional statements. In one or more embodiments of the invention, if the conditional statement is satisfied (i.e., the conditional statement evaluates to TRUE), a value of a corresponding field on a form (125) may be calculated based on the source data (110).

For example, a matching criterion may define a regular expression search string which may be used by the mediation service (100) to evaluate source data (110) for matches to a person's name (to be used in a name field). In this example, if the match is made, an address or telephone number of the person may be transmitted to the destination computing device (115) for use in a name field of a form (125). In another example, the matching criterion defines a field type (e.g., numerical, date, alphanumeric, or etc.) and a label. In this example, the mediation service (100) may search the source data (110) for values which match the field type and the label defined by the criterion. In yet another example, one or more medical claims are populated based on appointments in a user's calendar. In this example, the mediation service (100) identifies a matching criteria defining a doctor's name. The matching criteria may then be used to identify doctor appointments (with the specified doctor) in a calendar of the user on the source computing device (105). Continuing the example, the appointments may be used to populate one or more fields in a medical claim or insurance form in a destination computing device (115).

In one or more embodiments of the invention, the mediation service (100) includes functionality to match, based on a matching criterion, the source data (110) to a field on a form (125) in the destination computing device (115). Upon matching the source data (110), a value for the field may be calculated or identified within the source data (110).

The mediation service (100) may be configured to match source data (110) to one or more fields based on user preferences, usage patterns of a user, contact information, social networking relationships, application settings, mobile application data, geospatial metadata associated with one or more files, temporal data associated with one or more files (e.g., timestamps), and/or social networking "checkins" to a geographic location, in accordance with various embodiments of the invention. Application data may include data obtained from a procurement, financial management, expense, purchasing, and/or other application. For example, the mediation service (100) may identify financial transactions associated with a mobile banking application in a mobile device of a user based on a matching criterion identifying the application. Continuing the example, the financial transactions (i.e., source data) are used to calculate a summation of expenses and a total expense amount is calculated and used to populate a business tax form (125) in the destination computing device (115).

The mediation service (100) may also be configured to match source data (110) to one or more fields based on financial transactions made on a predefined day (e.g., of the month, week, year, etc.), transactions made at a predefined time of day, transactions with a predefined amount or with amounts within a (percentage or fixed) range of one another, any predefined number of transactions with a common payee, transactions made with a common type of merchant (e.g., category of goods or services sold), transactions with a common description or one or more common words in the description, transactions corresponding to one or more predefined calendar dates (e.g., tax filing deadlines, holidays, and/or dates imported from a social networking profile of the user, etc.), and/or any other criterion. The calendar server (100) may receive one or more matching criterion from a user and/or may be pre-configured with one or more matching criterion. In one or more embodiments of the invention, the mediation service (100) is configured to obtain source data (110) using credentials supplied by the user.

In one or more embodiments of the invention, the mediation service (100) includes functionality to perform optical character recognition (OCR) on one or more images within source data (110). By performing OCR, the mediation service (100) may analyze images and evaluate one or more matching criteria against data contained within the images. For example, a scanned tax return document may be downloaded into the source computing device (105). In this example, the mediation service (100) may perform OCR on the scanned image and extract tax-related amounts from the document to be used in populating one or more financial returns.

The mediation service (100) may, based on a definition of a matching criterion, download additional source data (110) and/or data related to source data (110) from a third party website or server application. For example, the mediation service (100) may scrape data from a social networking website in order to identify familial or friend relationships between the user of the source computing device (105) and one or more other people. The mediation service (100) may be configured to populate one or more fields on a form (125) with this content if an appropriate match is made. For example, marital status and dependence information may be automatically extracted from source data (110) and populated in a financial return of a user.

In one or more embodiments of the invention, the mediation service (100) includes functionality to identify geospatial data and/or metadata such as images, video files, websites, SMS messages, and/or RSS feeds in the source data (110). Geospatial data may include one or more GPS coordinates and/or any other form of geographical identification in accordance with various embodiments of the invention.

In one or more embodiments of the invention, the mediation service (100) includes functionality to calculate a value for a field on the form (125) based on the source data (110). The mediation service (100) may then populate the field with the value. The mediation service (100) may calculate the value using a mathematical function (e.g., mean, mode, summation) of one or more numerical amounts identified in the source data, a most frequently recurring textual string, a predefined value identified or defined by the matching criterion, a fraction of an amount identified within the source data (110), and/or a representative value identified based on one or more source data (110) items. For example, if contact information identifying a spouse is identified within the source computing device (105), the mediation service (100) may enter a value 'M' as a value representing "married" within a marital status field of a form (125). In another example, the mediation service (100) identifies a billing address of a credit card in application data of a financial management application of a mobile device. In this example, the user requests to upload the data from the mobile device to the destination computing device in order to populate fields on a checkout page of an electronic commerce website.

In one or more embodiments of the invention, the mediation service (100) includes functionality to aggregate data from a set of two or more source computing devices (e.g., source computing device (105)) of a user in order to evaluate a matching criterion. In one or more embodiments of the invention, the mediation service (100) is configured to obtain source data (110) from a user's profile on a website. Thus, the mediation service (100) may, based on a matching criterion, check the mediation service (100) in order to identify relevant source computing devices or other sources of source data (110). For example, the mediation service may identify a first source computing device, a second source computing device, and an online profile of a user on a social networking website. The mediation service (100) may be configured to evaluate one or more matching criterion based on the aggregate source data (110). In this example, the mediation service (100) is further configured to download a user's contacts from a social networking website. Upon obtaining all relevant source data (110), the mediation service (100) matches the source data (110) to one or more fields on a form.

In one or more embodiments of the invention, the source computing device (105) includes a global positioning system (GPS) receiver. The GPS receiver may be used to create data or metadata including GPS coordinates of a geographic location. These GPS coordinates may be embedded into one or more multimedia or application files. For example, an image taken by a mobile device may include geospatial metadata identifying the geographic location where the image was taken.

In one or more embodiments of the invention, the source computing device (105) includes a biometric scanner. The biometric scanner may be used to authenticate a user to the mediation service (100). For example, the mediation service (100) may authenticate the user using a fingerprint or other biometric scan obtained from the source computing device (105). Based on authenticating the user, the mediation service (100) may then establish a secure communication session or perform other functions requiring authentication of the user. In one or more embodiments of the invention, the destination computing device (115) receives biometric data relayed by the mediation service (100) and compares the biometric data to pre-existing biometric data of the user on the destination computing device (115). If the pre-existing data matches the relayed data, the destination computing device may determine that the user is authenticated.

Figure 2:
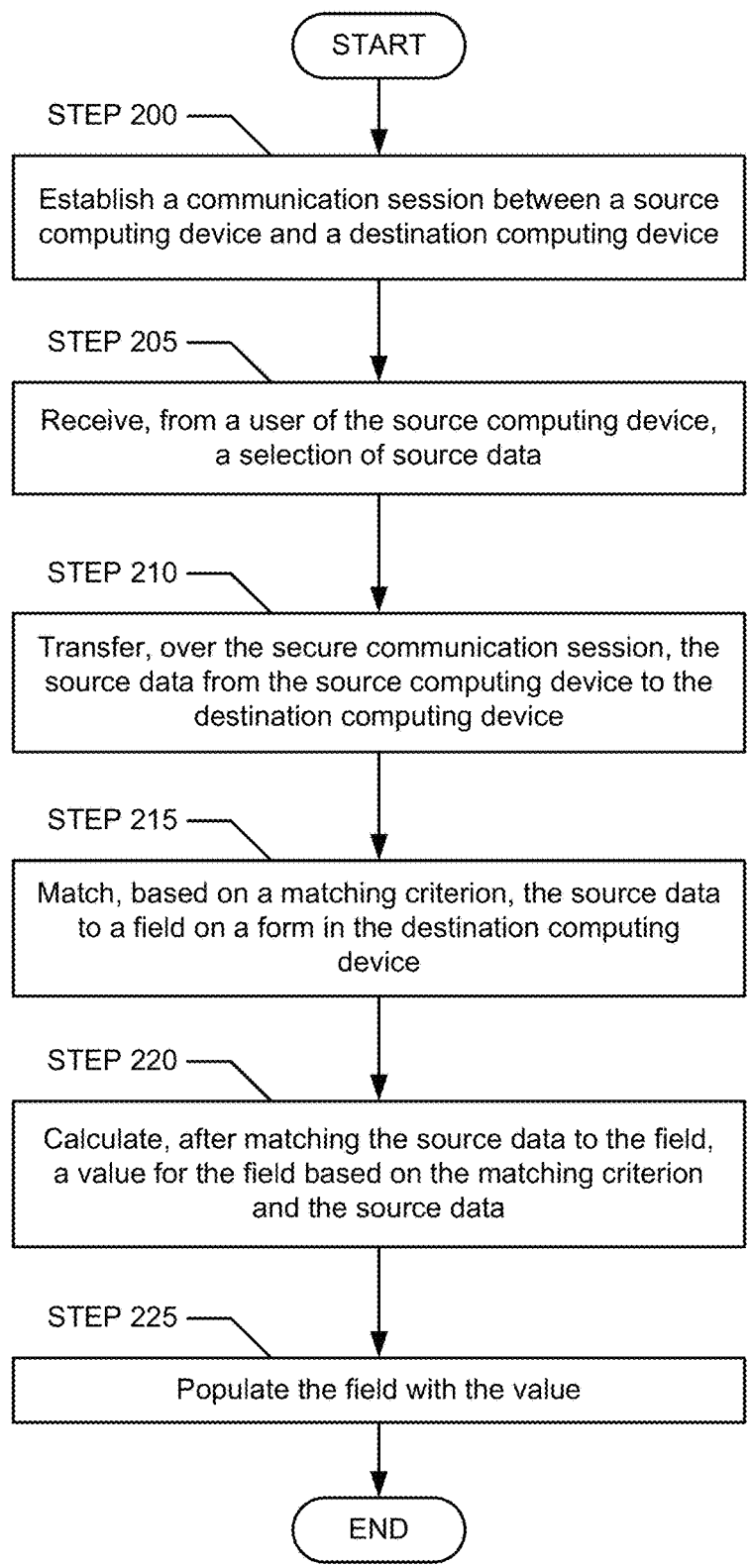
FIGS. 2 and 3 show flowcharts in accordance with one or more embodiments of the invention.

FIG. 2 shows a flowchart of a method for populating a field on a destination computing device based on source data obtained from a source computing device. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In STEP 200, in one or more embodiments of the invention, a communication session is established between a source computing device and a destination computing device. The communication session may be initiated by a source computing device, a destination computing device, or a mediation service, in accordance with various embodiments of the invention. The communication session may be initiated in response to a request by the user to transfer source data from the source computing device to the destination computing device.

In STEP 205, in one or more embodiments of the invention, a selection of source data is received from a user of the source computing device. Examples of selection of the source data may include, but are not limited to, highlighting, selection of a drop-down menu item, a screen capture option, and/or any other method of selecting data. The selection may also include identifying information of a destination computing device, a mediation service, a form, and/or user credentials, in one or more embodiments of the invention.

In STEP 210, in one or more embodiments of the invention, the source data is transferred, over the secure communication session, from the source computing device to the destination computing device. The transfer of source data may take place before or after evaluation one or more matching criteria, in one or more embodiments of the invention. Thus, in one or more embodiments of the invention, the source data is initially transferred to the mediation service and/or destination computing device and then (after transfer) evaluated using the matching criteria. Alternatively, in one or more embodiments of the invention, one or more matching criteria are evaluated using the source data in the source computing device. If a match is made, a subset of the source data required for calculating a field value may subsequently be transmitted to the mediation service and/or destination computing device.

In STEP 215, in one or more embodiments of the invention, the source data is matched, based on a matching criterion, to a field on a form in the destination computing device. The matching criterion is evaluated using the source data in order to determine whether a match is made. Each matching criterion corresponds to one or more fields on a form and is designed to identify data which may be used in calculating a value for the one or more fields.

In STEP 220, in one or more embodiments of the invention, after matching the source data to the field, a value for the field is calculated based on the matching criterion and/or the source data. The calculation may involve calculating a mathematical function based on inputs extracted from the source data or simply identifying a predefined value for the field, in accordance with various embodiments of the invention. Then, the field may be populated with the value (STEP 225).

FIG. 3 shows a flowchart of a method for establishing a communication session between a source computing device and a destination computing device. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, in one or more embodiments of the invention, a request is received from a source computing device to establish a communication session with a destination computing device. Alternatively, the request may be received from a mediation service or a destination computing device, in accordance with one or more embodiments of the invention.

In STEP 305, in one or more embodiments of the invention, an authentication image is received from the source computing device. The authentication image may be taken by a camera of the source computing device or may be identified by a user. The authentication image may then be transmitted from the source computing device to a mediation service.

In STEP 310, in one or more embodiments of the invention, the authentication image is sent to the destination computing device. Sending the authentication image to the destination computing device may allow the destination computing device to authenticate the source computing device. Alternatively, in one or more embodiments of the invention, the authentication image is transmitted only to the mediation service and the mediation service authenticates both the source computing device and the destination computing device.

In STEP 315, in one or more embodiments of the invention, a confirmation of the authentication image is received from the destination computing device. Alternatively, the confirmation may be sent from the mediation service to the source computing device and/or the destination computing device, in accordance with various embodiments of the invention.

In STEP 320, in one or more embodiments of the invention, in response to the confirmation, the communication session is established between the source computing device and the destination computing device. Upon receiving the confirmation, the source computing device, the mediation service, and/or the destination computing device may be configured to transmit and receive information over the secure communication session.

The following section describes various examples of the invention. The examples are included to aid in the understanding of the invention but are not intended to limit the scope of the invention.

Figure 4:
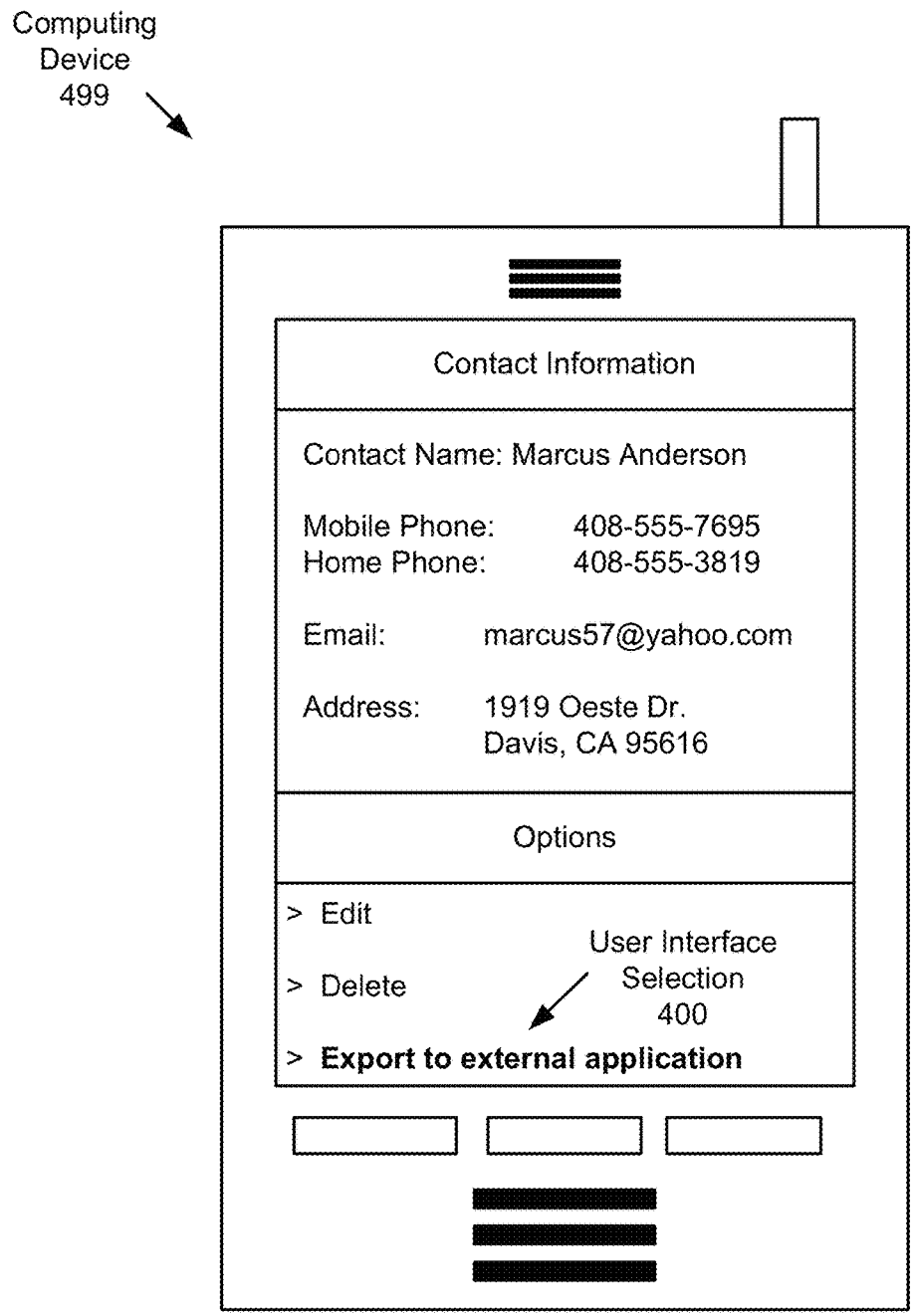
FIG. 4 shows an example computing device in accordance with one or more embodiments of the invention.
Figure 5:
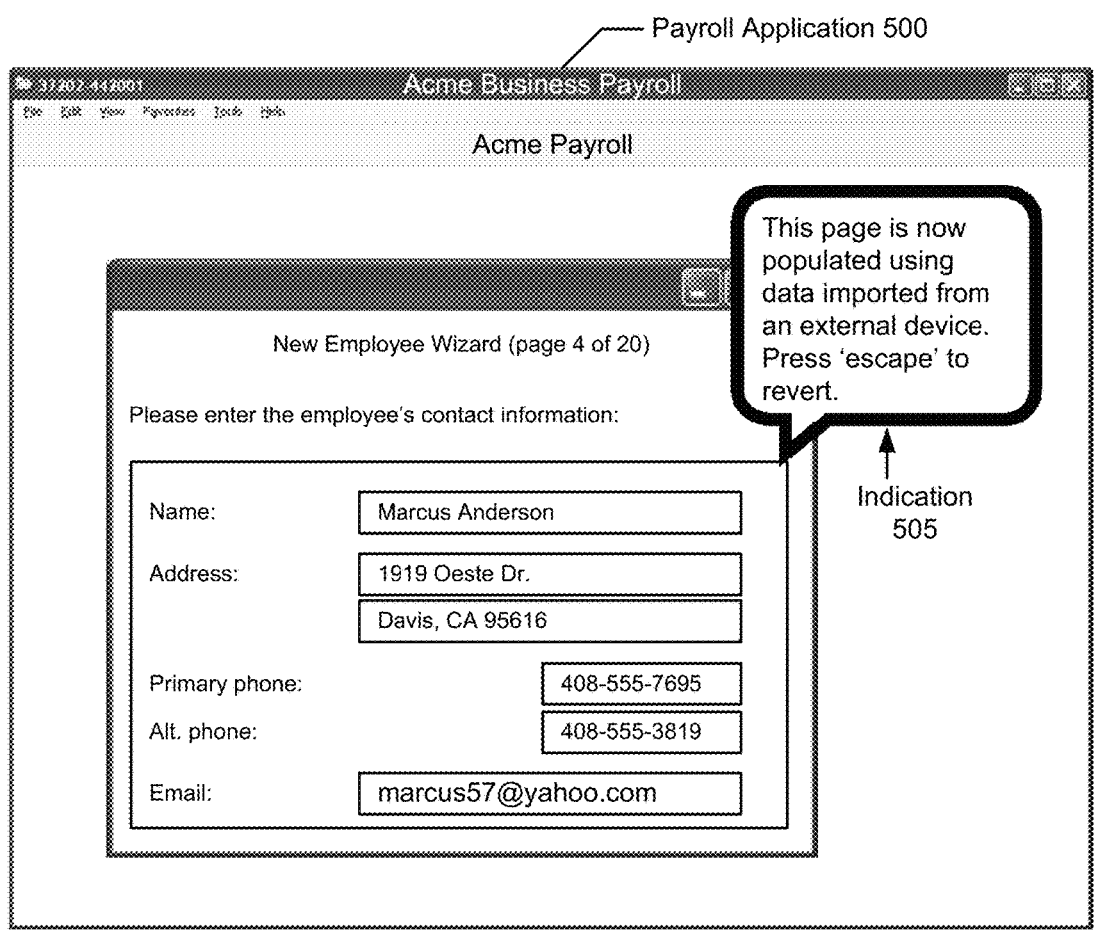
FIG. 5 shows an example screenshot of a client application in accordance with one or more embodiments of the invention.

FIG. 4 shows an example computing device (499) and FIG. 5 shows an example screenshot of a payroll application (500) executing on a desktop computer, in accordance with one or more embodiments of the invention.

In one example, a business owner meets a prospective employee for an employment interview. The business owner reviews the employee's resume and enters the employee's contact information into her computing device (499). Based on the interview, the business owner decides to hire the prospective employee and offers him the job. Later that week, the business owner executes a payroll application (500) she uses to manage her business payroll. In the payroll application (500), the business owner selects an option to add a new employee using a new employee wizard. Eventually, the business owner reaches a form in the wizard requiring the employee's contact information (see the example screenshot of FIG. 5).

Continuing the example, the business owner opens a contact page in the computing device (499) (see the example of FIG. 4) showing contact information of the prospective employee which she had entered into the computing device (499) earlier in the week. Rather than manually entering the contact information into the payroll application (500), the business owner makes a user interface selection (400) to export the contact information to an external application. The selection further includes identifying the payroll application (500).

Continuing the example, upon making the user interface selection (400), the mobile device sends a request to establish a secure communication session to a third party mediation service executing on a remote server. In response to the request, the mediation service sends notifications the desktop computer and the mobile device configuring an authentication method. In response to the notification, the mobile device displays a barcode image as an authentication credential on a display screen of the mobile device. The desktop computer starts a web camera and outputs a message to the business owner requesting that the owner hold the display screen of the mobile device in view of the web camera. The business owner does so, and the web camera takes a photograph of the display screen and proceeds to authenticate the user and the mobile device based on identifying the barcode image in the photograph. After completing authentication, the mediation service finalizes setup of the secure communication session.

Continuing the example, the contact information is submitted, using the secure communication session and over the Internet, from the mobile device to the desktop computer. Upon receiving the contact information, the payroll application begins evaluating a series of matching criteria against the contact information. A first matching criterion matches address information in the contact information to two address fields on the new employee wizard page by finding an "Address" label in the contact information. A second matching criterion matches the mobile phone and home phone numbers to respective fields in the wizard based on a regular expression format string and the labels "Home" and "Mobile". The name and email fields are similarly matched to fields in the wizard using matching criteria.

Continuing the example, the payroll application (500) proceeds to calculate default values for the new employee wizard page based on the imported contact information and the matching criteria. In this case, each matching criterion requires that matched data be transferred directly into its corresponding field. The payroll application (500) then displays an indication (505) to the business owner that the fields have been populated using the imported data. FIG. 5 illustrates an example screenshot of the populated form.

Figure 6:
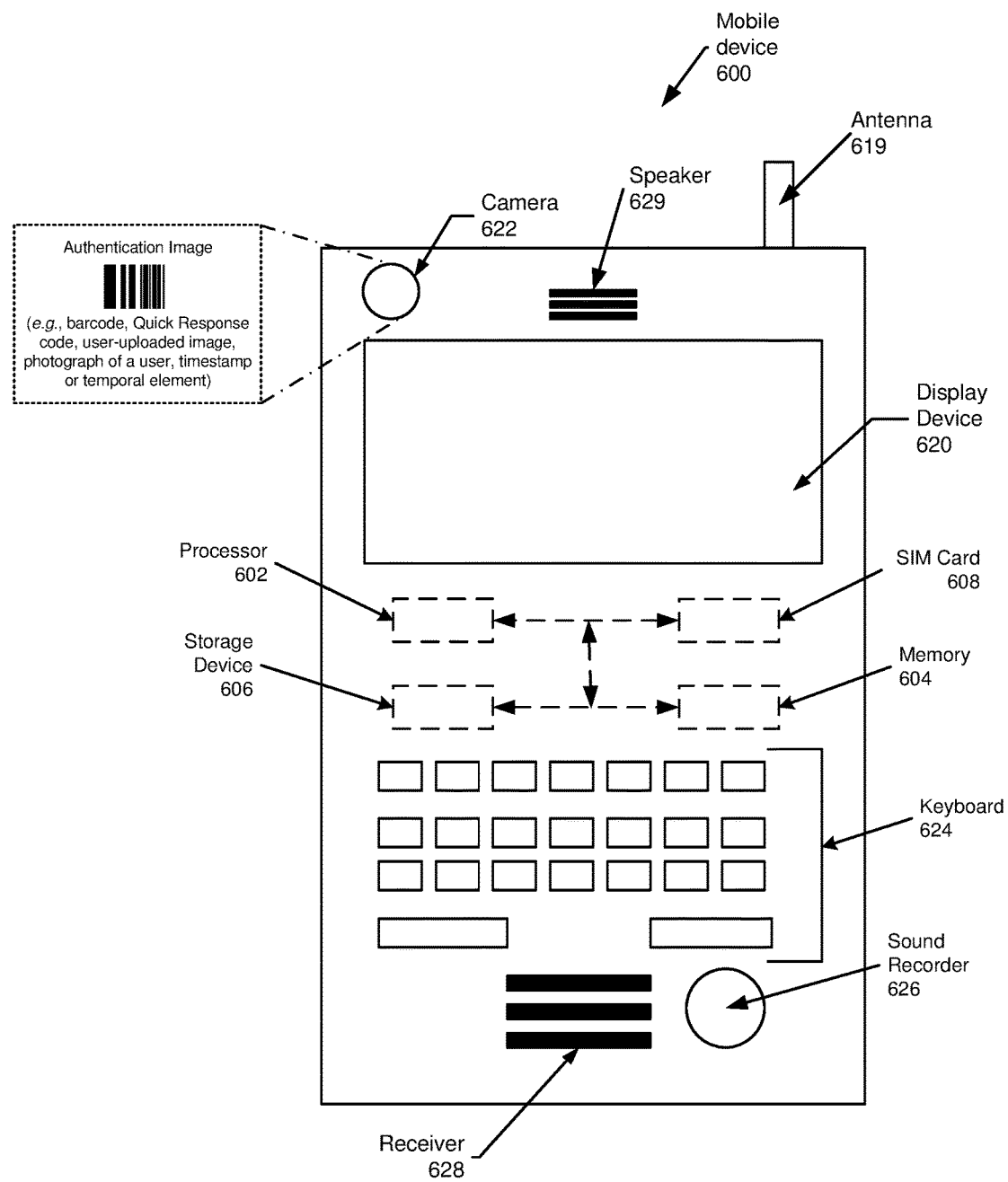
FIG. 6 shows a mobile device in accordance with one or more embodiments of the invention.

Embodiments of the invention may be implemented on virtually any type of mobile device regardless of the platform being used. In one or more embodiments of the invention, the mobile device (600) includes any portable device that provides a user interface. Examples of mobile devices may include, but are not limited to, cellular phones, personal digital assistants, personal communicators, pagers, smart phones, or any other computing device. For example, as shown in FIG. 6, a mobile device (600) includes a processor (602), memory (604), a storage device (606), a subscriber identification module (SIM) card (608), a speaker (629), a receiver (628), a keyboard (624), a sound recorder (626), a display device (620), a camera (622), and an antenna (619).

The mobile device (600) includes one or more processor(s) (602), associated memory (604) (e.g., RAM, cache memory, flash memory, etc.), a storage device (606) (e.g., a hard disk, an optical drive such as a compact disk drive or digital video disk (DVD) drive, a flash memory stick, etc.), a SIM card (608), and numerous other elements and functionalities typical of today's mobile devices (not shown). The mobile device (600) may include input means and output means, such as the keyboard (624), the receiver (628), and/or the display device (e.g., a liquid crystal display screen) (620), which permits a user to enter and/or display keystrokes including numeric, alphabetic, and other characters, images, or other media types. Other input devices may include a camera (622), a sound recorder (626), and/or other data recording mechanism. Those skilled in the art will appreciate that these input and output means may take other forms now known or later developed. Using embodiments of the present invention, a consumer may initiate an electronic funds transfer using the mobile device (600).

The mobile device (600) may be connected to a network (e.g., a local area network (LAN), a wide area network (WAN) such as the Internet, or any other similar type of network) via the antenna (619) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (600) with a mobile device identifier of the mobile device (600).

In one or more embodiments of the invention, the network connection may be facilitated by a hardwired or other similar connection. For example, the network connection may involve a hardwire connection or short-range wireless connectivity technology with a second mobile device, a printing mechanism, a scanner, or a recording system.

Figure 7:
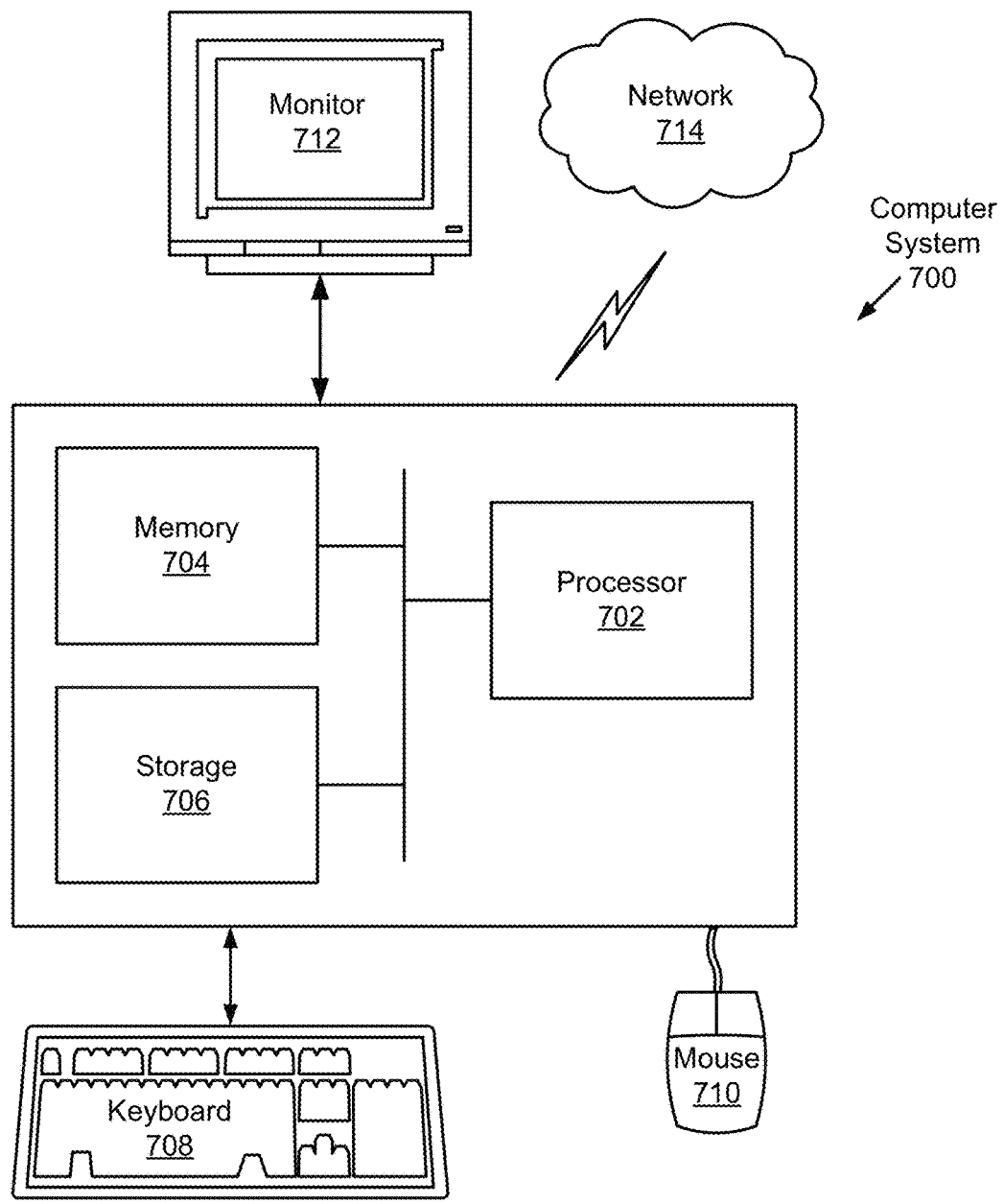
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) (such as a central processing unit (CPU), integrated circuit, hardware processor, etc.), associated memory (704) (e.g., RAM, cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g., source data (110), form (125), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By using source data in a source computing device to populate one or more fields of a form in a destination computing device, it may be possible to reduce data entry time. Furthermore, by automatically matching source data to a field and by calculating a value for the field, potential errors associated with data entry may be reduced or eliminated. Finally, by identifying and matching source data automatically, users may be freed from the burden of having to remember the location and relevance of data stored across multiple devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for populating a field on a form, comprising:
    establishing a secure communication session between a mobile phone and a personal computer, wherein establishing the secure communication session comprises:
        receiving, from the mobile phone, a request to establish the secure communication session;
        in response to receiving the request from the mobile phone, sending a notification to the mobile phone, wherein the mobile phone displays an authentication image in response to receiving the notification;
        receiving the authentication image from the mobile phone;
        sending the authentication image to the personal computer;
        receiving, from the personal computer, a confirmation that the authentication image matches a contents of a photograph of a display screen of the mobile phone captured using a camera of the personal computer; and
        establishing, in response to the confirmation, the secure communication session between the mobile phone and the personal computer;
    receiving, from a user of the mobile phone, a selection of a plurality of source data;
    transferring, over the secure communication session, the plurality of source data from the mobile phone to the personal computer;

matching, based on a matching criterion, the plurality of source data to the field in the personal computer, wherein matching the plurality of source data to the field comprises:
identifying, in the plurality of source data, a label text defined by the matching criterion, wherein the label text corresponds to the field;
calculating, after matching the plurality of source data to the field, a value for the field based on the matching criterion and the plurality of source data; and
populating the field with the value.

2. The method of claim 1, wherein the mobile phone includes another camera, and wherein the authentication image is obtained by the other camera of the mobile phone.

3. The method of claim 1, wherein the authentication image is a barcode.

4. The method of claim 1, wherein calculating the value for the field comprises:
identifying a plurality of monetary amounts in the plurality of source data; and
calculating a summation of the plurality of monetary amounts, wherein the value is the summation.

5. The method of claim 1, wherein the form is a tax form and wherein the value is a monetary amount.

6. The method of claim 1, wherein the plurality of source data comprises geospatial metadata obtained using a global positioning system receiver of the mobile phone.

7. The method of claim 1, wherein the plurality of source data comprises contact information.

8. A non-transitory computer-readable storage medium storing a plurality of instructions for populating a field on a form, the plurality of instructions comprising functionality to:
establish a secure communication session between a mobile phone and a personal computer, wherein establishing the secure communication session comprises:
receiving, from the mobile phone, a request to establish the secure communication session;
in response to receiving the request from the mobile phone, sending a notification to the mobile phone, wherein the mobile phone displays an authentication image in response to receiving the notification;
receiving the authentication image from the mobile phone;
sending the authentication image to the personal computer;
receiving, from the personal computer, a confirmation that the authentication image matches a contents of a photograph of a display screen of the mobile phone captured using a camera of the personal computer; and
establishing, in response to the confirmation, the secure communication session between the mobile phone and the personal computer;
receive, from a user of the mobile phone, a selection of a plurality of source data;
transfer, over the secure communication session, the plurality of source data from the mobile phone to the personal computer second;
match, based on a matching criterion, the plurality of source data to the field in the personal computer, wherein matching the plurality of source data to the field comprises:
identifying, in the plurality of source data, a label text defined by the matching criterion, wherein the label text corresponds to the field;
calculate, after matching the plurality of source data to the field, a value for the field based on the matching criterion and the plurality of source data; and
populate the field with the value.

9. The non-transitory computer-readable storage medium of claim 8, wherein the mobile phone includes another camera, and wherein the authentication image is obtained by the other camera of the mobile phone.

10. The non-transitory computer-readable storage medium of claim 8, wherein the authentication image is a barcode.

11. The non-transitory computer-readable storage medium of claim 8, wherein the form is a tax form and wherein the value is a monetary amount.

12. The non-transitory computer-readable storage medium of claim 8, wherein calculating the value for the field comprises:
identifying a plurality of monetary amounts in the plurality of source data; and
calculating a summation of the plurality of monetary amounts, wherein the value is the summation.

13. The non-transitory computer-readable storage medium of claim 8, wherein the plurality of source data comprises geospatial metadata obtained using a global positioning system receiver of the mobile phone.

14. A system for populating a field on a form, comprising:
a mobile phone configured to:
receive, from a user, a selection of a plurality of source data; and
display an authentication image in response to receiving a notification;
a personal computer comprising:
a camera configured to capture a photograph of a display screen of the mobile phone; and
a client application configured to:
display the form to the user; and
populate the field with a value;
a mediation service configured to:
establish a secure communication session between the mobile phone and the personal computer;
transfer, over the secure communication session, the plurality of source data from the mobile phone to the personal computer;
match, based on a matching criterion, the plurality of source data to the field in the personal computer, wherein matching the plurality of source data to the field comprises:
identifying, in the plurality of source data, a label text defined by the matching criterion, wherein the label text corresponds to the field;
calculate, after matching the plurality of source data to the field, the value for the field based on matching the criterion and the plurality of source data; and
send the value to the personal computer; and
a hardware server comprising the mediation service, wherein the mediation service is further configured to establish the secure communication session by:
receiving, from the mobile phone, a request to establish the secure communication session;
in response to receiving the request from the mobile phone, sending the notification to the mobile phone, wherein the mobile phone displays the authentication image in response to receiving the notification;
receiving the authentication image from the mobile phone;
sending the authentication image to the personal computer;

receiving, from the personal computer, a confirmation that the authentication image matches a contents of the photograph of the display screen of the mobile phone captured using the camera of the personal computer; and establishing, in response to the confirmation, the secure communication session between the mobile phone and the personal computer.

15. The system of claim 14, wherein the mobile phone includes another camera, and wherein the authentication image is obtained by the other camera of the mobile phone.

16. The system of claim 14, wherein the mobile phone further comprises a global positioning system (GPS) receiver, and wherein the plurality of source data comprises geospatial metadata obtained using the GPS receiver.

17. The system of claim 14, wherein calculating the value for the field comprises:

identifying a plurality of monetary amounts in the plurality of source data; and calculating a summation of the plurality of monetary amounts, wherein the value is the summation.

18. The system of claim 14, wherein the form is a tax form and wherein the value is a monetary amount.

19. The system of claim 14, wherein the authentication image is a barcode.

20. The system of claim 14, wherein the plurality of source data comprises contact information.

\* \* \* \* \*